F. M. F. CAZIN.
NUT-LOCK.

No. 172,387.  Patented Jan. 18, 1876.

Witnesses:
F. B. Townsend
R. K. Evans

Inventor:
Francis M. F. Cazin
by A. H. Evans & Co
his attys.

UNITED STATES PATENT OFFICE.

FRANCIS M. F. CAZIN, OF DENVER, COLORADO TERRITORY.

IMPROVEMENT IN NUT-LOCKS.

Specification forming part of Letters Patent No. 172,387, dated January 18, 1876; application filed September 1, 1875.

*To all whom it may concern:*

Be it known that I, FRANCIS M. F. CAZIN, of Denver, Colorado, have invented certain new and useful Improvements in Lock Nuts and Bolts, of which the following is a full, clear, and exact description, reference being had to the accompanying drawings, making a part of this specification, in which—

Figure 1:
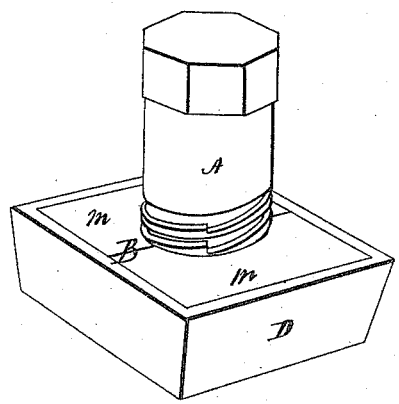
Figure 2:
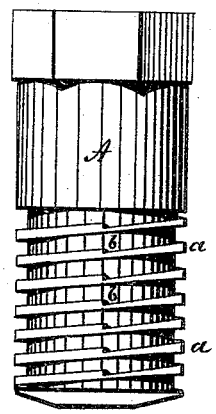
Figure 3:
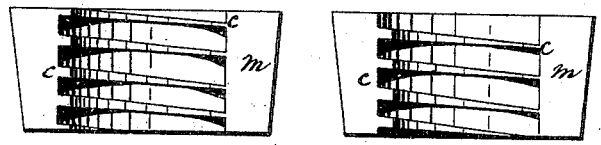

Figure 1 is a perspective view of my invention. Fig. 2 is a side view of the bolt's thread. Fig. 3 is an inside view of the nut.

My invention will be first fully described, and subsequently pointed out in the claim.

To enable others skilled in the art to make and use my invention, I will proceed to described the exact manner in which I have carried it out.

In the said drawings, A represents a bolt having a square thread, $a$, and distinguished from ordinary square threads by the lower or inside plane of the thread (the plane facing toward the head of the bolt) forming a continuous zigzag line, dividing the circumferential screw-line in as many offsets as are necessary for the special purpose of the lock-bolt. The offsets on each single thread form, with the offsets on the other single threads, a line parallel to the axis of the bolt, thereby forming as many parallel lines to the axis of the bolt as there are offsets on one turn of the thread. The shoulders or offsets $b$ on the threads of the bolt face toward the head of the bolt. B is the nut, made in two sections, $m\ m$, whose sides are slightly beveled. This nut is so constructed that when the two sections are placed together the threads have shoulders or offsets $c$ on the upper plane of their surfaces, corresponding with those on the bolt-thread. When the nut is screwed on the bolt sufficiently tight to cause a pressure in an opposite direction, the shoulders or offsets on the bolt-thread are caused to come in contact with those on the thread of the nut, thereby securely holding or locking the nut to the bolt. When the outward pressure is removed the nut can be screwed off the bolt, as there is sufficient space between the bolt-threads to allow the shoulders of the nut-thread to pass. D is a frame or band, constructed with beveled sides to receive and hold the sections $m\ m$ of the nut B.

Although I have shown the bolt A and nut B provided with a single thread, the same may be constructed with two or more parallel threads, as will be readily understood by those skilled in the art.

It is also evident, from the foregoing description, that the beveled frame D and the two halves of the outside beveled nut fit together, whereby the pressure exercised on the bolt-head and nut in screwing up forces the two halves of the nut together, especially so if the frame projects, on the narrow or in side, over the half-nut. Thus the nut answers its full purpose, without being welded or otherwise joined permanently, by the pressure caused in screwing it up.

Having thus described my invention, what I claim as new, and desire to secure by Letters Patent, is—

The combination, with a bolt, A, constructed with a zigzag or ratchet-faced thread or threads, of a nut, B, formed in sections $m\ m$, provided with a correspondingly-formed zigzag thread or threads, and held together by a band, D, substantially as shown and described.

FRANCIS MICHAEL FREDERICK CAZIN.

Witnesses:
   C. F. ADOLPH FISCHER,
   OWEN E. LE FEVRE.